March 8, 1966 J. Z. JACOBY 3,239,810

MAGNETIC CORE COMPARATOR AND MEMORY CIRCUIT

Filed July 26, 1961 3 Sheets-Sheet 1

INVENTOR
J. Z. JACOBY
BY S E Hollander
ATTORNEY

MAGNETIC CORE COMPARATOR AND MEMORY CIRCUIT

Filed July 26, 1961 3 Sheets-Sheet 2

INVENTOR
J. Z. JACOBY
BY S E Hollander
ATTORNEY

INVENTOR
J. Z. JACOBY
BY S E Hollander
ATTORNEY 3,239,810
Patented Mar. 8, 1966

3,239,810

MAGNETIC CORE COMPARATOR AND MEMORY CIRCUIT

John Z. Jacoby, Murray Hill, N.J., assignor to Bell Telephone Laboratories, Incorporated, New York, N.Y., a corporation of New York Filed July 26, 1961, Ser. No. 127,025
14 Claims. (Cl. 340—146.2)

This invention relates to comparator circuits and, more particularly, to circuits employing magnetic cores for comparing two sequences of binary digits.

Very often, illustrations of which will be given below, it is necessary to compare two binary digits, or two sequences of binary digits or "words." Magnetic cores are often employed for this purpose. A set of words may be stored in a magnetic core array, the input word to be compared with a particular word in the set. In addition, the input word is often required to replace the word it is compared with in the set. Advantageously, the input word may be and often is written into those cores storing the word it is to be compared with. Any change in the magnetization state of any of these cores indicates that the two words are different. Thus at the same time that the input word is stored in the array, a detecting circuit may detect changes in magnetization state and the comparison is achieved.

Magnetic core arrays may be bit- or word-organized. In the former, each element represents an isolated piece of information. In the latter, individual elements are organized in groups, all the group bits together comprising a single word of information. The magnetization states of the magnetic cores comprising most bit- and word-organized arrays are switched back and forth by the application of coincident currents. All cores in each row are threaded by an individual conductor. Similarly, a conductor threads each core in every column. A single core is selected in the bit-organized array by energizing the row and column conductors through it. One-half of the current required to switch the magnetization state of a core is applied to each of the selected conductors. The one selected core is the only core in the array having a sufficient switching magnetomotive force applied to it and consequently is the only core whose magnetization is switched.

In a word-organized array, on the other hand, it is desirable to simultaneously switch or set the magnetizations of all cores comprising the particular word under consideration. If all cores in each column represent a different word, the setting of the cores is advantageously and quite popularly achieved by simultaneously energizing the single column conductor and all row conductors passing through cores of the word whose magnetizations are to be switched. Again only half of the switching current is applied to each row and the single column conductor.

Both the bit- and word-organized arrays may be of two different types. The first type of array comprises all memory core arrays having a normal magnetization state, commonly referred to as the reset state. The other magnetization state is termed the set condition. An example of a bit-organized array of this type is that in which the magnetization state of each core represents the service request of a different telephone subscriber. In the normal condition, a subscriber's core is in the reset state indicating that no service is desired. When the subscriber goes off-hook, desiring service, the magnetization of the core is switched to the set state and is detected by the appropriate telephone equipment. When the subscriber goes on-hook once again, the magnetization of his core is restored to the normal reset condition.

Similarly, word-organized arrays may be of this first type wherein the normal condition of each core comprising an individual word is referred to as the reset state.

In both bit- and word-organized arrays of this first type a common sense conductor often threads each core in the array. The switching of magnetization states in any core induces a voltage pulse in the sense conductor which is detected and a subsequent series of operations is initiated. The bits or words in arrays of this first type are often interrogated by applying reset pulses to the cores. Coincident currents reset the individual core in the bit-organized array and all cores in the selected word in the word-organized array. In the bit-organized array the induced voltage pulse in the sense conductor indicates that the selected core had been previously set, the reset pulse switching the magnetization back to the normal condition. In a word-organized array the induced pulse is indicative that at least one core in the word had been priorly set.

The second type of bit-organized array is that kind in which there is no normal reset magnetization state of each core. An example of this type of array is to be found in many ordinary data communication systems wherein a first polarity of magnetization represents a binary "0" and a second represents a binary "1," and neither condition is preferred or normal. Interrogation of a single bit in the bit-organized array of this type is similar to the interrogation of a bit in the first type of array. If a bit is in one state and is then switched to the other, an induced pulse appears in the sense conductor. If a "0" was previously stored in the core and a "1" is now written into it, a first polarity induced voltage pulse is obtained on the common sense conductor. If, on the other hand, a "1" was previously stored and a "0" is now written, the opposite polarity induced voltage pulse results. The writing into and the interrogation of each core are simultaneous. Each time a different binary value is written into the single core, interrogation automatically ensues. An output pulse is obtained only if the state of the core switches. Since the pulsing equipment knows which binary value is now being written into the core, it can easily determine the previous state of the core or the previous binary value stored therein.

The interrogation, however, of word-organized arrays of the second type is not so easily accomplished. Since all cores in an individual word are pulse simultaneously, many cores in the first magnetization state may be switched to the second. Similarly, many cores in the second magnetization state may be switched to the first. Were a common sense conductor threaded through every core in the array it is possible that the opposite polarity pulses induced in this conductor by those cores whose magnetization states are switched may cancel or mask each other. This is particularly true where the same number of cores are switched from the first to the second magnetization state as the number of cores switched from the second to the first magnetization state. Thus, although entirely different words may be written into the cores, it is possible that no resultant induced voltage pulse on the sense conductor is obtained.

This problem is not encountered in word-organized arrays of the first type. There, interrogation is accomplished by resetting all cores, that is, by applying the same polarity magnetomotive forces to all cores. There can thus be only one polarity pulse induced in the sense conductor. It is only in the second type of word-organized array where interrogation is accomplished by writing in a new word that opposite polarity magnetomotive forces are applied with the resultant opposite polarity induced pulses in the sense conductor.

It is the second type of word-organized array that is best suited for comparing an input word with a particular word in a given set of words stored in an array, and for replacing the latter with the input word. This is true because the two operations may be performed simultaneously. At the same moment that the input word is written into the array, flux reversals in the appropriate cores indicate that the new word is different from the old one. However, if a common sense conductor is employed to detect flux reversals, as has been explained, it is possible for the induced pulses to mask each other and consequently the detecting equipment will be unable to determine that a change has occurred.

This difficulty is avoided in many word-organized arrays of the second type and the comparator circuits with which they are employed by the utilization of a plurality of sense conductors. If the cores in each column comprise a single word, quite often an individual sense conductor threads each core in every row. Thus, when a new word is written into the array, each sense conductor is threaded through only one core comprising that word. Any core whose magnetization is switched induces the appropriate polarity pulse in the associated sense conductor. Detecting equipment connected to each of the sense conductors detects these pulses. The appearance of an induced pulse of either polarity in any one of the sense conductors is indicative of the fact that a different word is now stored in the cores.

The pulsing equipment associated with each row may have registered the binary value being presently written into the core of the word in that row. An induced pulse in the sense conductor indicates that that bit has been switched and consequently the pulsing equipment determines that the opposite binary value was priorly stored in that bit. The interrogation equipment can thus even reconstruct the previously stored word.

Very often, however, it is not necessary to reconstruct the previously stored word. Instead, it is merely necessary to detect that a change in the word has occurred. For example, in a data communications systems wherein it is desired to transmit the quotations of various stocks, the transmitting equipment may include a word-organized array wherein each word represents the quotation of a different stock. As the quotation varies the latest value is stored in the appropriate group of cores. It is necessary to transmit the quotation to the receiving equipment, however, only if the quotation of a particular stock has changed. Consequently, it is only necessary to detect a change in the word stored rather than the particular change in each bit of that word. If a change is indicated, the new quotation is transmitted. Thus, in word-organized arrays of the second type where it is desired to detect an over-all change in the word rather than the particular change in each bit of the word it is not necessary to provide a different sense conductor for each row. The detecting equipment associated with each of the many sense conductors is quite often expensive and thus a common sense conductor would be most advantageous, requiring only a single detecting circuit. However, heretofore, this has not been practical for, as has been stated, although an entirely different word may be written into the array, the output pulses in the common sense conductor may mask each other. This is especially true if equal numbers of cores switch magnetization states in opposite directions. The present invention is a comparator circuit employing a word-organized array of the second type utilizing only a single sense conductor threaded through every core in the array and yet wherein the masking of the induced pulses by each other is precluded.

It is an object of this invention to provide a comparator circuit employing a word-organized magnetic core matrix array utilizing only a single sense conductor for reliably determining whether or not the word being written into the array is different from the word it is replacing.

It is another object of this invention to reduce the cost, complexity and size of the detecting equipment associated with word-organized arrays having no normal core magnetizations.

Sometimes it is not only necessary to determine whether or not there has been a change in the word stored, but also whether this change is due to "0's" becoming "1's," or "1's" becoming "0's," or both. For example, in a data communications systems adapted for transmitting airline reservations and wherein each bit in a single word represents a seat reservation on a particular plane, a binary "1" may indicate that that seat is reserved while a binary "0" may indicate that the seat is still vacant. A magnetic core memory array at the transmitting end may contain the seating information relating to a plurality of planes. This information may be scanned and transmitted to various receivers. Some of these receivers, however, may have need only for information pertaining to new reservations made while other receivers may have need for information pertaining only to reservation cancellations. Consequently, when the seating information is written into a word of the array, it would be advantageous to obtain a first polarity pulse indicating that some cores have switched from a binary "0" to a binary "1" and a second polarity pulse indicating that others of the cores have switched from a binary "1" to a binary "0." If neither polarity pulse is obtained no information is transmitted since the presently stored word is the same as the priorly stored one. If only a first polarity pulse is obtained indicating that new reservations have been made, the word information may be transmitted only to those receivers requiring new reservation information. If, on the other hand, only the second polarity pulse is obtained, the new word may be transmitted only to those receivers requiring cancellation data. If both polarity pulses are obtained, the new word may be transmitted to both types of receivers.

It is still another object of this invention to provide a comparator circuit employing a word-organized array having a single sense conductor wherein a first polarity pulse is induced by the switching of any cores in the array from a first magnetization state to a second magnetization state followed by a second pulse of opposite polarity if any cores in the array are switched from the second to the first magnetization state.

Briefly, in accordance with an aspect of this invention, information is written into a word-organized array by the use of coincident current techniques. A single column conductor threads al cores in a different word. An individual conductor threads each core in every row. A common sense conductor threads every core in the array. By the application of the appropriate polarity currents to the row conductors, one-half of the switching magnetomotive force is applied to every core in the word, the polarity of each magnetomotive force being dependent on the binary value of the respective bit to be written. Successive current pulses of oppoiste polarities are applied to the single column conductor. Each of these current pulses applies a magnetomotive force of half the switching value to each core in the word. Thus, when the first polarity column pulse is applied those cores having applied to them the same polarity magnetomotive force from the row currents switch to the first magnetization state, if they are not already in that state. When the second column pulse of opposite polarity is applied those cores having applied to them magnetomotive forces from the row currents of the same polarity switch to the second magnetization state, if they are not already in that state. The duration of each column pulse is one-half the duration of each row pulse. It is thus seen that if any cores switch to the first magnetization state a first polarity pulse is induced in the common sense conductor. If, immediately thereafter, any of the cores switch to the second magnetization state, an opposite polarity pulse is induced in the common sense conductor. In this manner, successive opposite polarity pulses may be induced in a single sense conductor indicating that some bits in the word have changed from "0" to "1," or that some have changed from "1" to "0," or both.

It is a feature of this invention to apply successive opposite polarity magnetomotive forces to all cores contained in a word of a matrix array.

It is another feature of this invention to apply to all cores in the memory array pulses of either polarity having a duration equal to the combined duration of two successive opposite polarity column pulses.

It is still another feature of this invention to thread a common sense conductor through all cores in the word-organized magnetic core matrix array of a comparator circuit.

A complete understanding of this invention and the various features thereof may be gained from consideration of the following detailed description and the accompanying drawing in which.

Figure 3:
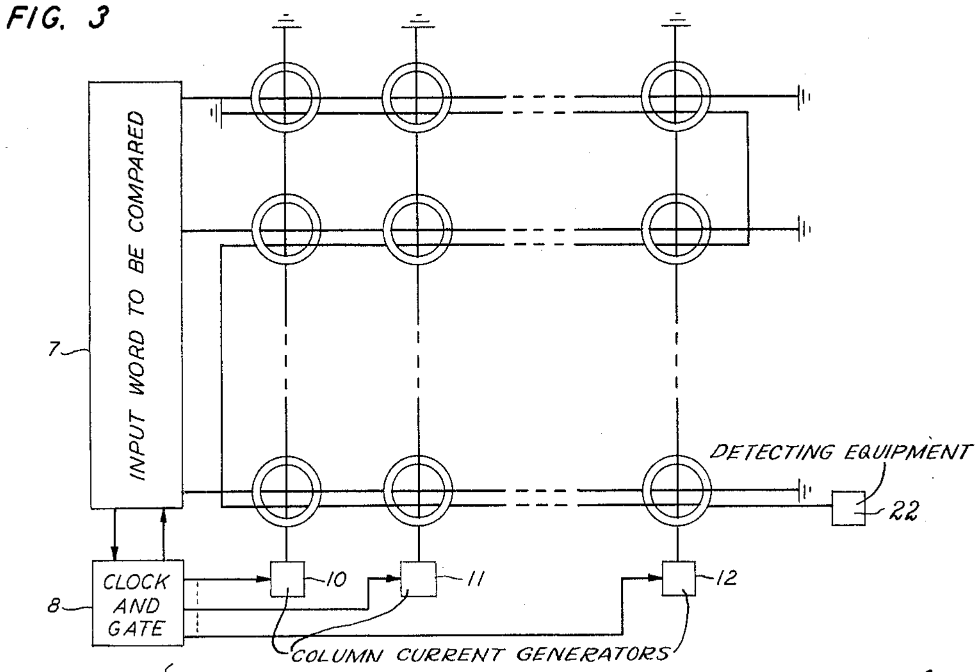
FIG. 3 depicts a third illustrative embodiment of the invention.
Figure 4:
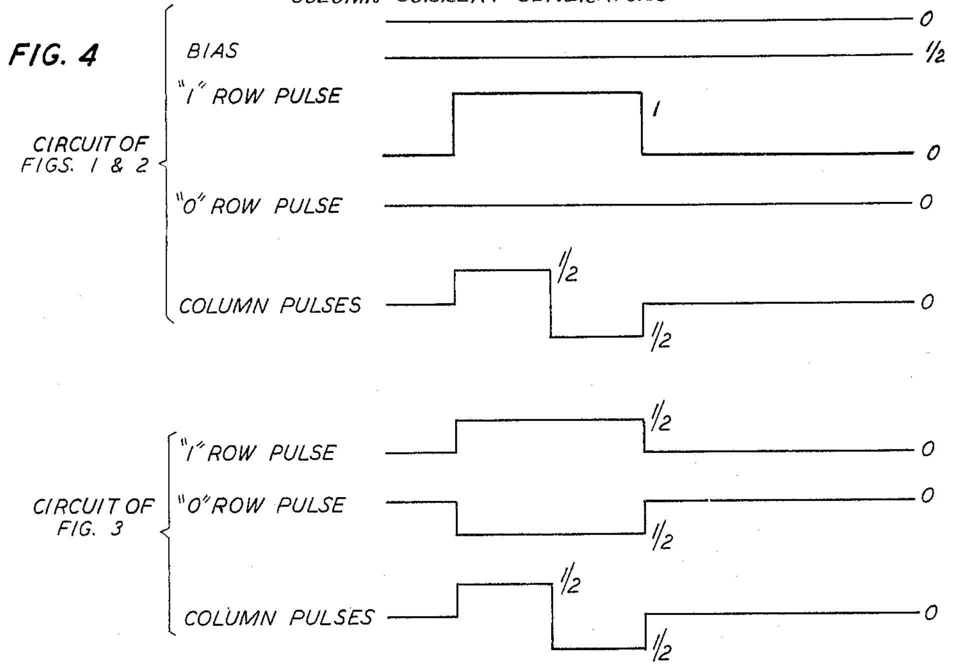
Figure 5:
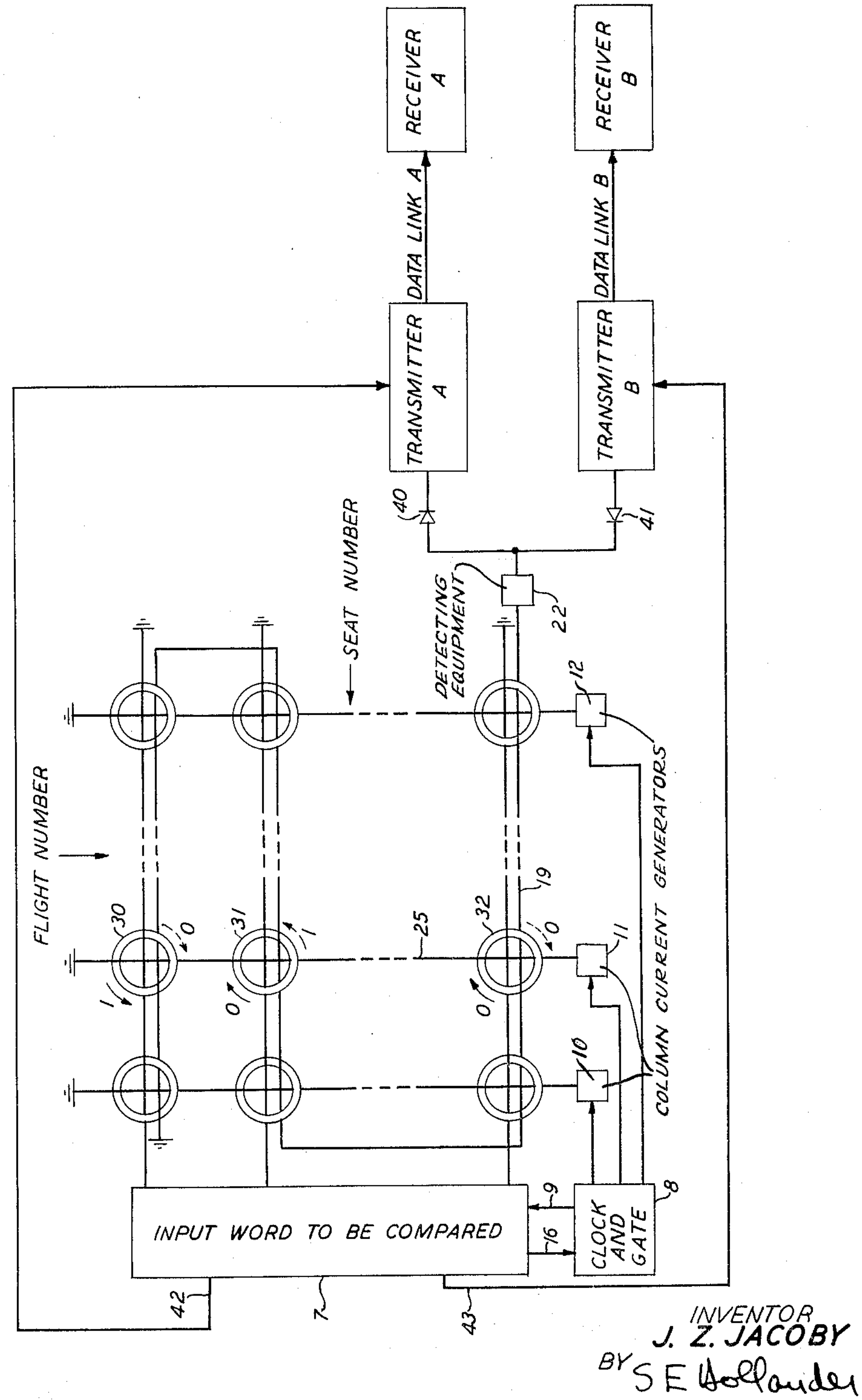

FIG. 4 discloses illustrative magnetomotive force pulses for switching the cores in the three illustrative embodiments; and FIG. 5 shows the embodiment of FIG. 3 utilized in an illustrative application.

Figure 1:
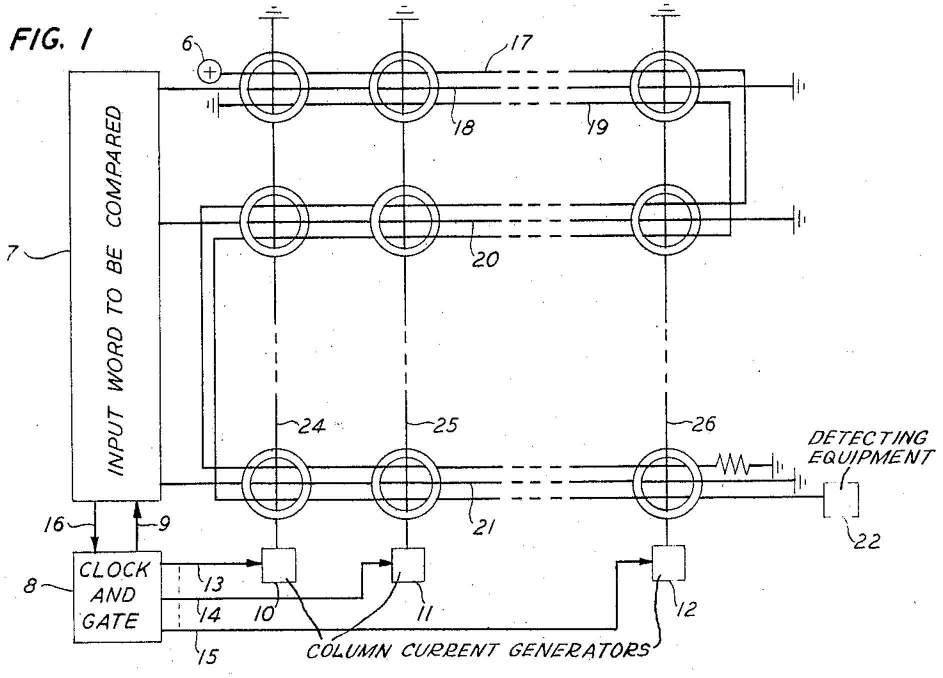
FIG. 1 depicts a first illustrative embodiment of the invention.

Referring to FIG. 1, the comparator circuit matrix array comprises a plurality of magnetic cores each column of which represents an individual word. A common sense conductor 19 threads each core in the array and is terminated at one end at ground and at the other at detecting equipment 22. This equipment detects induced voltage pulses in conductor 19 of either polarity.

The magnetomotive force required to switch the magnetization state of any core shall, for convenience sake, be designated as one unit above or below a reference level of zero. Conductor 17 is terminated at one end at ground and at the other at positive potential 6, and threads each core of the array. The current flowing in conductor 17 biases each core of the array with a magnetomotive force having a magnitude of one-half as shown in FIG. 4 and is in the clockwise direction. When it is desired to set a core in the "1" state, the magnetomotive force pulse applied by the current in the appropriate row conductor has a magnitude of one unit as shown in FIG. 4. This counterclockwise magnetomotive force applied to the core by the row pulse opposes that applied by the bias current. The resultant magnetomotive force applied to the core is one-half unit in the counterclockwise direction. If it is desired to set the core in the "0" state, no pulse is applied to the appropriate row conductor and the resultant magnetomotive force applied to the core is merely that resulting from the bias current, namely, one-half unit in the clockwise direction.

Initially, a set of words is stored in the array. The input word is stored in register 7. In addition, the register also contains the address (column number) of the word with which the input word is to be compared and which is to be replaced. Each bit stage of the register is connected to a different row conductor. In response to a signal from the clock and gate equipment 8 on conductor 9, those stages containing binay "1's" apply current pulses to the respective row conductors, of which only conductors 18, 20 and 21 are shown in the drawing. The clock and gate equipment controls the durations of these pulses in a manner to be explained hereinbelow.

A signal on conductor 16 from register 7 notifies the clock and gate equipment 8 in which column the input word is to be written. This equipment, by applying signals over a plurality of conductors, of which only conductors 13, 14 and 15 are shown, controls the column current pulse generators.

Successive opposite polarity current pulses each having a magnitude of one-half unit are applied to the selected column conductor. The column current generators, of which only generators 10, 11 and 12 are shown connected to respective conductors 24, 25 and 26, apply the pulses shown in FIG. 4. The combined duration of the two column pulses, controlled by the clock and gate equipment 8, equals the duration of the row pulse applied to those cores to be set in the "1" state. The first column pulse applies to each core in the column a counterclockwise magnetomotive force having a magnitude equal to one-half of the switching magnitude. It is followed by a magnetomotive force of the oppoiste polarity having the same magnitude. Those cores to be set in the "1" state have applied to them, as previously described, a magnetomotive force of one-half unit in the counterclockwise direction due to the application of the row pulse. When the first column pulse is applied these cores switch from the "0" to the "1" state if they are not already in the "1" state. A first polarity pulse is induced in the common sense conductor 19 and current flows from ground to detecting equipment 22 indicating that at least one core in the word has switched from "0" to the "1" state.

Immediately thereafter, the second column pulse switches those cores in the column having applied to them a magnetomotive force of one-half unit in the clockwise direction from the "1" to the "0" state. This one-half unit is derived from the bias current as has been explained above. If any cores in the column switch from the "1" state to the "0" state a second polarity voltage pulse is induced in sense conductor 19 and current flows from detecting equipment 22 to ground. Thus, successive opposite polarity pulses are induced in the common sense conductor in response to the switching of at least one core from either magnetization state to the other. If no core switches state, no induced pulses are obtained. If the only switching of magnetization states is in some cores from the "0" state to the "1" state, only the first polarity current in conductor 19 flows. If the only switching is in some cores from the "1" state to the "0" state, only the second polarity current flows. If some cores switch from the "0" to the "1" state and others switch from the "1" to the "0" state both polarity current pulses are obtained in succession.

Figure 2:
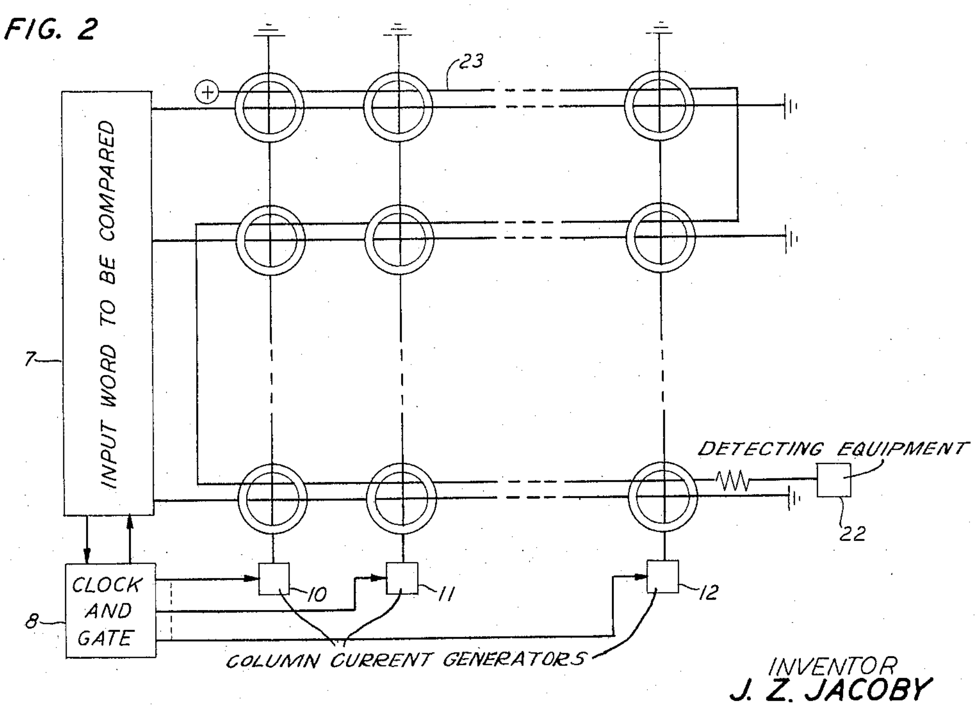
FIG. 2 depicts a second illustrative embodiment of the invention.

The embodiment of FIG. 2 is identical to that of FIG. 1 except for the fact that sense conductor 19 and bias conductor 17 have been combined in a single conductor 23. The induced pulses are superimposed on the ever-present bias current. Detecting equipment 22 responds to the superimposed pulses. The circuit of FIG. 2 requires a minimum number of conductors and affords a highly advantageous embodiment of the invention having minimum size and complexity and a cost comparable with conventional arrays.

The embodiment of FIG. 3 is similar to that of FIG. 2 except that the bias current has been eliminated. As shown in the second group of current pulses of FIG. 4, the row pulses rather than having a magnitude of either "0" or "1" now have a magnitude of one-half but of either polarity. The magnetomotive forces applied to the cores by the row pulses are again one-half unit in magnitude and of either polarity. The operation of the circuit is the same as those of FIGS. 1 and 2 except that the magnetomotive forces applied to the cores by the row pulses now arise from opposite polarity input pulses rather than a single polarity input pulse and a bias current as in the first two embodiments.

The illustrative application of FIG. 5 incorporating the embodiment of FIG. 3 will aid in the understanding of the present invention. In this figure a data communications system is adapted for transmitting airline reservations and cancellations, each bit in a single word representing a seat reservation on a particular flight with the binary "1" value indicating that the seat is reserved, while a binary "0" indicates that it is still vacant. Receiver A which may be disposed at airline ticket counters, etc., must be notified of all new reservations while receiver B also at a remote location is to be notified of all cancellations. The second left-most column, for example, represents the reservation information concerning a particular flight. This information is stored in the column of cores at a first time. At a later time the flight information may have changed and for this reason the most up-to-date data is placed in register 7 (by equipment not shown in the drawing). In addition, the flight number (column number) is likewise stored in this register. In response to a signal from the clock and gate equipment 8 on conductor 9, register 7 applies the appropriate current pulses to the row conductors. At the same time the address information is transmitted via conductor 16 from register 7 to the clock and gate equipment 8 and current pulse generator 11 is energized. This generator applies the two successive opposite polarity magnetomotive forces, each of one-half the switching magnitude, to the second left-most column of cores.

Suppose that core 30 is initially in the "1" state indicating that the associated seat is reserved while cores 31 and 32 are both in the "0" state indicating that the respective seats are vacant. The remaining cores in the column, not shown in the drawing, are in either of the two different states. The initial states of cores 30, 31 and 32 are shown on the drawing adjacent respective solid arrows in the directions of the core magnetizations.

The most up-to-date flight data stored in register 7 may indicate that the reservation of the first seat has been canceled, and the second seat has since been reserved, while the remaining seats on the flight represented by the remaining cores in the column including the last have had no new reservations or cancellations. The magnetization states of cores 30, 31 and 32 which must be now set are shown adjacent the respective cores with the dotted arrows indicating the new flux directions.

When the first column pulse is applied to conductor 25 by source 11 a counterclockwise magnetomotive force of one-half the switching value is applied to each core in the column. This magnetomotive force in coincidence with the application of counterclockwise row magnetomotive forces of magnitudes one-half, switch the cores to which both magnetomotive forces are applied to the "1" state. In the present case only the second core switches magnetization state from the clockwise or "0" state to the counterclockwise or "1" state. A first polarity pulse is induced in sense conductor 19 and detected by equipment 22. Since one core has switched from the "0" to the "1" state, detecting equipment 22 signals transmitter A via diode 40 to transmit the latest flight information to receiver A which must be notified of all new reservations. In a similar manner when the second column pulse is applied the only core that switches magnetization state is the first. This core changes from the "1" to the "0" state and in consequence a second polarity pulse is induced in the sense conductor. In response to its detection by equipment 22, transmitter B is signaled via diode 41 and the latest flight information is also transmitted to receiver B which must be notified of any cancellations, in this specific example, the cancellation of the reservation of seat 1. The most recent data which is to be transmitted is coupled by conductors 42 and 43 to the two respective transmitters A and B.

It is thus seen that the invention affords the detection of opposite polarity induced pulses in a common sense conductor of a word-organized array employed in a comparator circuit wherein the word being written may contain bits having either binary value and differing from the previous word stored in any manner whatsoever. This is achieved with a minimum increase in the size, cost and complexity of the conductor windings, pulsing equipment and detecting circuits of conventional arrays.

Although the invention has been described with reference to certain specific embodiments, it is to be understood that these embodiments are only illustrative of the application of the principles of the invention and that various modifications may be made therein without departing from the spirit and scope of the invention.

What is claimed is:

1. A comparator circuit for comparing first and second sequences of binary digits comprising a plurality of magnetic cores having first and second remanent magnetization states arranged in rows and columns, register means coupled to rows of said cores for first applying to said cores register magnetomotive forces having polarities representative of the binary values of said first sequence and for thereafter applying to said cores register magnetomotive forces having polarities representative of the binary values of said second sequence, said magnetomotive forces being of insufficient magnitudes alone to switch the remanent magnetizations of said cores, generator means coupled to columns of said cores for selectively applying to said columns of cores two successive opposite polarity magnetomotive forces of insufficient magnitudes alone to switch the remanent magnetizations of said cores, means for controlling said generator means to apply both of said successive magnetomotive forces during each application of said register magnetomotive forces, and sensing means coupled to all of said cores for detecting reversals of magnetization state in the cores of said columns during the interval of continuance of said register magnetomotive forces with each of said successive opposite polarity magnetomotive forces applied by said generator means.

2. A comparator circuit in accordance with claim 1 further including first and second transmission circuits, means for operating said first transmission circuit responsive to the detection of flux reversals in a first direction by said sensing means and means for operating said second transmission circuit responsive to the detection of flux reversals in a second direction by said sensing means.

3. A comparator circuit for comparing first and second sequences of binary values comprising a plurality of magnetic cores arranged in rows and columns; first conductor means individually coupled to all cores in each of said rows; second conductor means individually coupled to all cores in each of said columns; third conductor means coupled to all of said cores; first current means connected to said third conductor means for continuously applying to said cores approximately one-half the magnetomotive force required to set said cores in a first magnetization state; register current means selectively connectable to said first conductor means for applying to said cores magnetomotive forces individually sufficient to set said cores in a second magnetization state; means for controlling said register current means to apply two sets of said magnetomotive forces, the first set representative of the binary values in said first sequence and the second set representative of the binary values in said second sequence; means connected to said second conductor means for selectively applying to a particular column of said cores two successive magnetomotive forces of opposite polarities having magnitudes greater than one-half but less than the full magnitude required for setting said cores in either of said magnetization states during each operation of said register current means; and means connected to said third conductor means for detecting induced voltages therein responsive to the switching of any of said cores from said first to said second or from said second to said first magnetization states.

4. A comparator circuit for comparing first and second sequences of binary valued digits comprising an array of magnetic cores, having first and second magnetization states, arranged in rows and columns; first conductor means individually coupled to all cores in each of said rows; first current means selectively connectable to said first conductor means for first applying to said cores first magnetomotive forces of either polarity but of insufficient magnitudes for setting said cores in either of said magnetization states, said first magnetomotive forces having polarities representative of the binary values of respective digits in said first sequence, and for then applying to said cores second magnetomotive forces of either polarity but of insufficient magnitudes for setting said cores in either of said magnetization states, said second magnetomotive forces having polarities representative of the binary values of respective digits in said second sequence; second conductor means individually coupled to all cores in each of said columns; second current means selectively connectable to said second conductor means for applying to said cores third, fourth, fifth and sixth magnetomotive forces of alternate opposite polarities all having magnitudes insufficient to set said cores in either of said magnetization states but sufficient to set said cores in either of said magnetization states with the simultaneous application of said first or second magnetomotive forces; means for controlling the application of said third and fourth magnetomotive forces to coincide with the application of said first magnetomotive forces and for controlling the application of said fifth and sixth magnetomotive forces to coincide with the application of said second magnetomotive forces; third conductor means coupled to every core in said array; and means connected to said third conductor means for detecting induced voltages therein responsive to the switching of any core in said array from one of said magnetization states to the other of said magnetization states.

5. A comparator circuit in accordance with claim 4 further including first and second receiver circuits, means for transmitting said second sequence to said first receiver in response to the operation of said detecting means during the application of said fifth magnetomotive forces, and means for transmitting said second sequence to said second receiver in response to the operation of said detecting means during the application of said sixth magnetomotive forces.

6. A circuit for comparing a sequence of binary valued signals to a selected one of a set of binary valued sequences comprising an array of magnetic cores having first and second magnetization states arranged in rows and columns, each binary valued sequence being represented by the magnetization states of a column of magnetic cores in said array, means for coupling said binary valued signals to the particular cores representing the binary valued sequence with which said signals are to be compared to apply magnetomotive forces to said cores of insufficient magnitudes to switch said cores to either of said magnetization states, means for applying successive magnetomotive forces of opposite polarities and insufficient magnitudes for setting the magnetizations of said particular cores, and means coupled to every core in said array for detecting a flux reversal in any one of said cores responsive to the simultaneous application of said signals and either one of said successive magnetomotive forces.

7. A comparator circuit for comparing first and second sequences of binary valued signals for determining if at least one signal in said two sequences is different comprising a plurality of magnetic cores each having two stable magnetization states, means for setting the magnetization states of said cores in accordance with respective signals in said first sequence wherein a first magnetization state represents a first binary value and the second magnetization state represents the second binary value, means for applying first magnetomotive forces to said cores in accordance with the binary values of the signals in said second sequence wherein a first polarity represents the first binary value and a second polarity represents the second binary value, each of said first magnetomotive forces having a magnitude insufficient for setting the magnetizations of said cores, means for applying to all of said cores second and third successive opposite polarity magnetomotive forces having magnitudes sufficient to set the magnetizations of said cores only with the simultaneous application of one of said first magnetomotive forces of the same polarity, and means coupled to all of said cores for detecting a first flux reversal in any of said cores responsive to the application of said second magnetomotive forces and for detecting a second flux reversal responisve to the application of said third magnetomotive forces.

8. A memory array comprising a plurality of bistable devices arranged in groups, means for continuously biasing all of said devices with a first signal having a magnitude approximately one-half the magnitude required to switch said devices from a first to a second stable state, means for selectively applying to said devices second signals alone sufficient to switch said devices from said second to said first stable state, and means for selectively applying to said groups of said devices a third signal having a magnitude equal to approximately one-half the magnitude required to switch said devices from one stable state to the other succeeded by a fourth signal of opposite polarity having a magnitude equal to one-half the magnitude required for switching said devices from the other to said one stable state.

9. A matrix array comprising a plurality of bistable devices arranged in rows and columns, means connected to each of said devices for applying a continuous signal of half the value required to set said devices in a first stable state, means selectively connectable to rows of said devices for applying to said devices a sufficient signal in the absence of said continuous signal for setting said devices in a second stable state, means selectively connectable to columns of said devices for applying a first signal alone insufficient for setting said devices in one of said stable states followed by a second signal of opposite polarity alone insufficient for setting said devices in the other of said stable states, and means for detecting the setting of any of said devices in either of said stable states responsive to the application of either of said first or second signals.

10. A memory array comprising a plurality of magnetic cores arranged in rows and columns, means selectively connectable to rows of said cores for applying to said cores first magnetomotive forces of sufficient magnitudes to set said cores in a first magnetization state, means continuously coupled to all of said cores for applying second magnetomotive forces of insufficient magnitudes to set said cores in a second magnetization state but of sufficient magnitudes to prevent the setting of said cores in said first magnetization state by said selectively connectable row means, and means selectively connectable to columns of said cores for applying third and fourth magnetomotive forces of opposite polarities and having magnitudes insufficient to set said cores by themselves but sufficient to set said cores in either of said magnetization states with the simultaneous application of either said first or second magnetomotive forces.

11. A memory array in accordance with claim 10 further including detecting means coupled to all of said cores for detecting the switching of magnetization states in any of said cores.

12. A memory array comprising a plurality of magnetic cores having first and second megnetization states arranged in rows and columns, first means individually coupled to all cores in each of said rows for applying to said cores first magnetomotive forces of either polarity but of insufficient magnitudes for setting said cores in either said first or second magnetization states, means selectively connectable to columns of said cores for applying to said core successive second and third magnetomotive forces of opposite polarities and of insufficient magnitudes for setting said cores in either of said magnetization states, and means for detecting the switching from one of said magnetization states to the other of said magnetization states responsive to the simultaneous application of said first magnetomotive forces and either one of said second or third successive magnetomotive forces.

13. A memory array in accordance with claim 12 wherein the duration of application of said first magnetomotive forces by said first means is greater or equal to the combined duration of application of said second and third magnetomovtie forces by said selectively connectable means.

14. A memory array comprising a plurality of bistable devices arranged in rows and columns, first means individually coupled to all devices in each of said rows for applying to said devices first signals of insufficient magnitude for setting said devices in a first or second stable state, second means selectively connectable to columns of said devices for applying successive second and third signals for setting said devices in opposite stable states respectively but of insufficient magnitudes for so setting said devices, and means for detecting the setting of said devices in either of said two stable states responsive to the simultaneous application of said first signals and either one of said second or third successive signals.

References Cited by the Examiner

UNITED STATES PATENTS

| | | | |
|---|---|---|---|
| 2,691,155 | 10/1954 | Rosenberg et al. | 340—174 |
| 2,862,198 | 11/1958 | Stuart-Williams et al. | 340—174 |
| 2,902,677 | 9/1959 | Counihan | 340—174 |
| 2,973,508 | 2/1961 | Chadurjian | 340—149 X |
| 2,997,692 | 8/1961 | Lamy | 340—146.2 |
| 3,136,977 | 6/1964 | Lamy et al. | 340—174 X |

ROBERT C. BAILEY, *Primary Examiner.*

MALCOLM A. MORRISON, *Examiner.*